United States Patent [19]

Campbell et al.

[11] 4,258,798

[45] Mar. 31, 1981

[54] AIR PASSAGES FOR PNEUMATIC TOOLS

[75] Inventors: Gordon C. Campbell, Irmo; Robert H. Alexander, Columbia, both of S.C.; George C. Atwell, Butler, Pa.

[73] Assignee: Rockwell International Corporation, Pittsburgh, Pa.

[21] Appl. No.: 19,036

[22] Filed: Mar. 9, 1979

[51] Int. Cl.³ ............................................. B23B 45/04
[52] U.S. Cl. ...................................... 173/168; 181/230
[58] Field of Search ................ 173/168, 170, DIG. 2; 181/230

[56] References Cited

U.S. PATENT DOCUMENTS

| 2,950,775 | 8/1960 | Zwayer | 173/163 X |
| 2,966,138 | 12/1960 | Quackenbush | 173/163 |
| 3,228,486 | 1/1966 | Raman et al. | 192/93 A X |
| 3,323,615 | 6/1967 | Ressler | 181/230 |
| 3,880,245 | 4/1975 | Anderson, Jr. | 173/163 |
| 3,949,944 | 4/1976 | Bent | 181/230 X |

Primary Examiner—Ronald Feldbaum

[57] ABSTRACT

A tool handle construction incorporating a unitary inlet-exhaust assembly, allowing economies of construction.

2 Claims, 2 Drawing Figures

AIR PASSAGES FOR PNEUMATIC TOOLS

BACKGROUND OF THE INVENTION

The field of art to which this invention pertains includes inlet-exhaust construction incorporating a muffler on pneumatic hand tools.

The majority of commercially available pneumatic hand tools include a muffler of sorts. These mufflers are usually used in tools having an exhaust extension or the like whereby the muffler can be accommodated, for instance, those shown in U.S. Pat. Nos. 3,880,245 and 3,299,781. Another approach to the problem includes U.S. Pat. No. 3,823,795, where the exhaust air is directed forwardly, and space is provided in the top of the handle, above the hand grip area, for muffling.

In the first example, extensions on the exhaust passage are bulky and expensive and up until the present invention, utilized separate passages throughout the length of the handle for inlet and for exhaust. In the second example, in addition to the space requirement between the operators hand hold and the motor, the forwardly directed air is undesirable, providing an opportunity to mark a workpiece with the lubricant commonly included in the air supply to pneumatic tools.

OBJECTS OF THIS INVENTION

It is accordingly a principal object of this invention to provide an improved inlet-exhaust combination for portable pneumatic tools having a "pistol-grip" type of handle.

It is another important object of this invention to provide a compact, economical inlet-exhaust combination for portable pneumatic tools that can be inserted as a unitary assembly into the end of the handle of pistol-grip type of tool.

It is a further object of this invention to provide an inlet-exhaust combination that permits the handle of a pistol-grip type of tool to be of simple construction, effecting economies of fabrication, machining and assembly.

DESCRIPTION OF THE INVENTION

Figure 1:
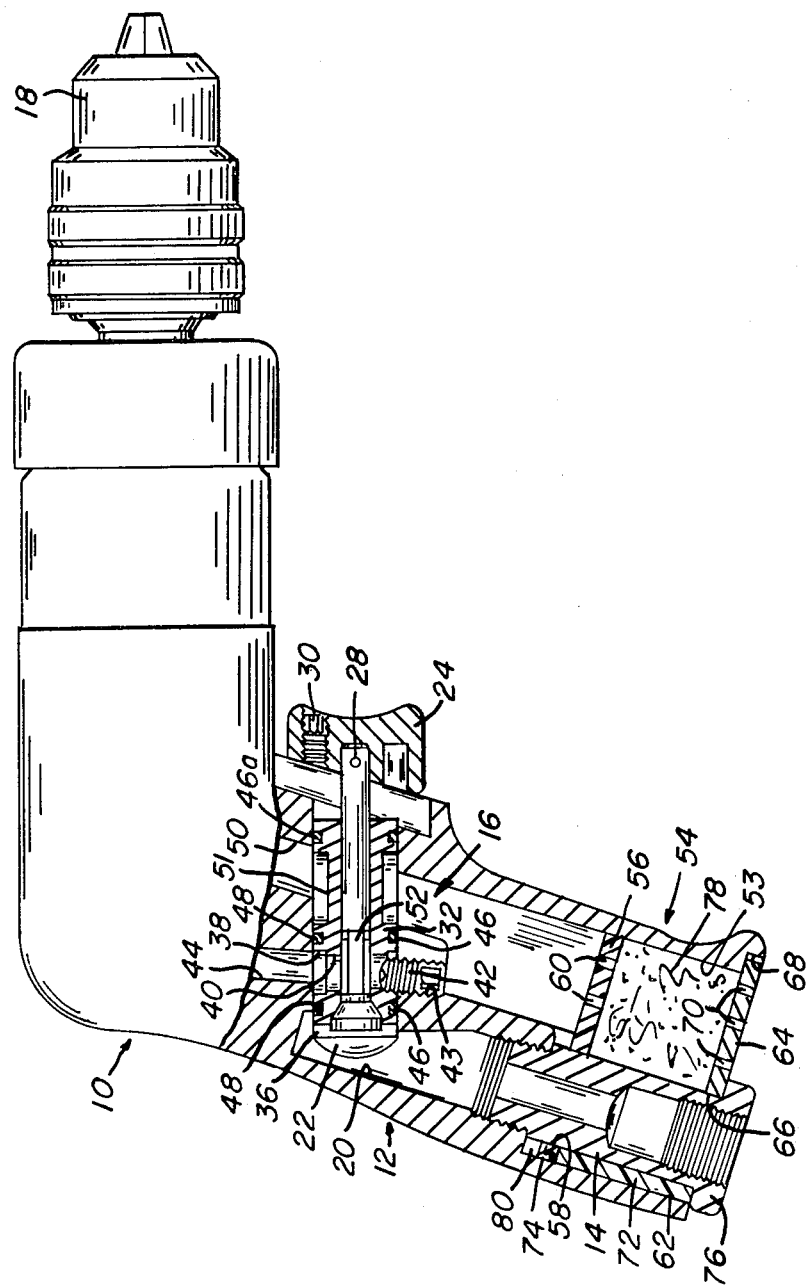
FIG. 1 is a side elevation view of a tool incorporating the instant invention, with the handle portion shown in section to illustrate the invention.
Figure 2:
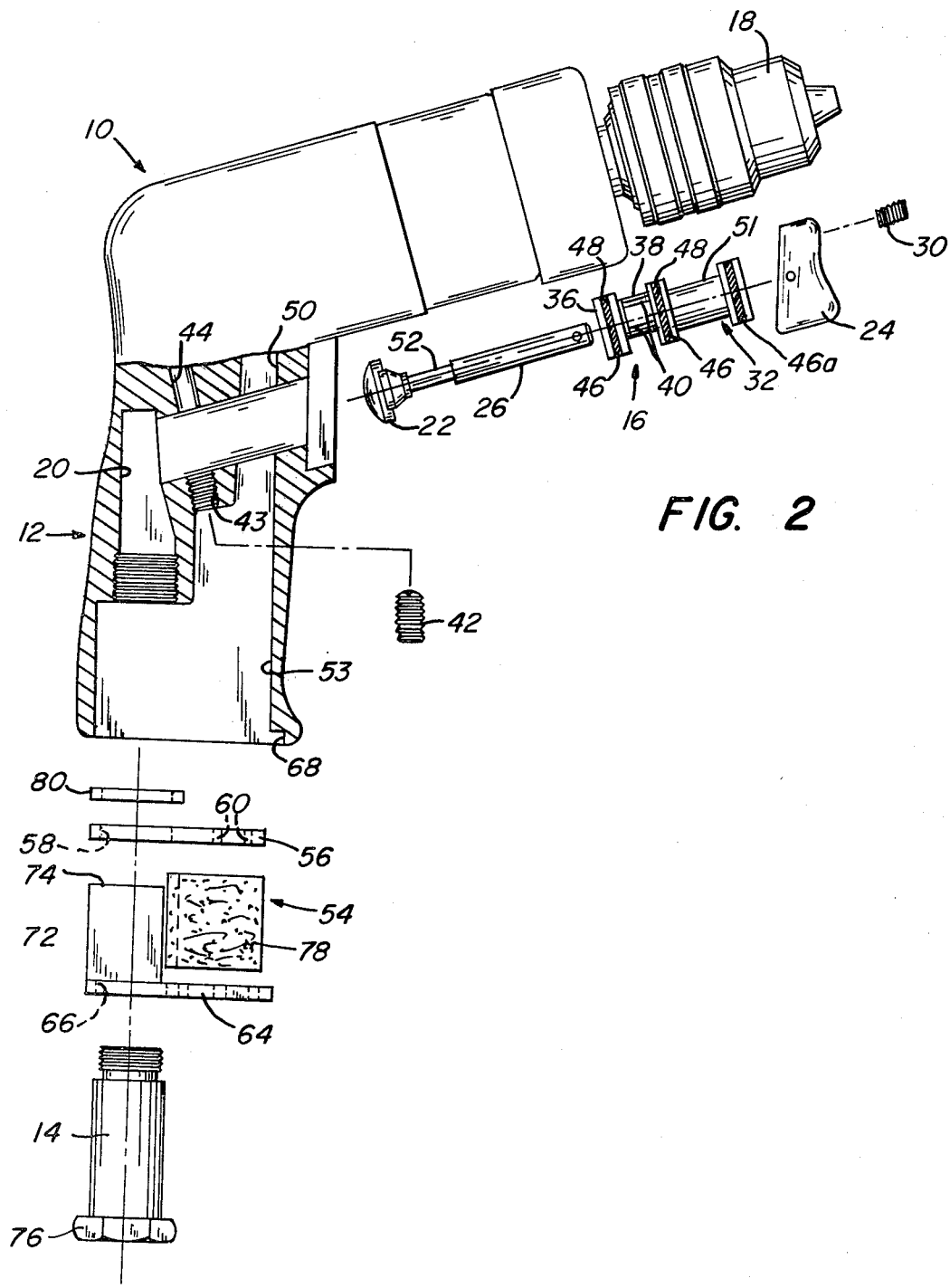
FIG. 2 is a view similar to FIG. 1, with the parts extended in an "exploded" configuration.

In the figures, a portable drill 10 is shown by way of illustration. The handle 12 is formed to accept a hose adapter 14 for attaching a supply hose. A trigger assembly 16 controls the flow of inlet air to a conventional air motor (not shown) which is connected to a work performing member 18.

This invention is directed to the provision within the handle of inlet and outlet passages and controls. When inlet air is supplied through adapter 14, it flows through passage 20 to valve member 22 of trigger assembly 16. A control trigger 24 is fastened to the other end of valve stem 26 by suitable means, such as pin 28. Thus, the amount of pressure fluid admitted is controlled by finger pressure of the operator. As is customary, an adjustable screw 30 can be set to limit the inward travel of the trigger 24, thus pre-setting the air supply to the motor.

The valve stem 26 is inserted through valve bushing 32 before the trigger 24 is fastened on the stem end. This bushing has a longitudinal through bore 34 to accommodate stem 26, and a seat surface 36 cooperating with valve 22 to seal off the passage of air to the tool when desired. The exterior of the bushing 32 has two reduced-diameter portions, the first of these reduced-diameter portions 38 also has longitudinal slots 40 connecting the bore 34 with the exterior of portion 38 of bushing 32. When installed in a tool 10, trigger assembly 16 is retained in place by a setscrew 42 threaded into a threaded portion 43 of the internal body of handle 12, aligning slots 40 and reduced-diameter portion 38 with a passage 44, which connects to the inlet of the air motor. Seals 46 mounted in recesses 48 on the periphery of bushing 32 seal passage 44 from inlet passage 20 and from an exhaust passage 50.

Thus, it can be seen that the inlet fluid enters the tool via a supply hose (not shown) which is threaded into hose adapter 14, passes through passage 20 to assembly 16, around valve 22 into bore 34. It should be mentioned here that valve stem 26 closely fits bore 34, but has a reduced diameter portion 52 to allow passage of fluid into slots 40 when the valve is operated. From slots 40, the fluid passes through the reduced-diameter portion 38 of bushing 32, into inlet passage 44 which leads to the air motor.

After passing through the air motor, exhaust air enters passage 50. Valve bushing 32 bridges across passage 50, but has a reduced-diameter external periphery 51 similar to portion 38, except that periphery 51 is solid (without any slots). As explained before, one of the O-ring seals 46 seals this passage 50 from inlet passage 44, and another O-ring 46a seals passage 50 from atmosphere. At the bottom of the handle 12, passage 50 opens into a combined inlet-outlet chamber 53, which is open at the bottom to atmosphere. It is in this chamber that hose adapter 14 is mounted. To muffle the noise of the exhausted fluid, an exhaust assembly 54 is mounted on hose adapter 14, encircling it and extending to the walls of chamber 53. A cap 56, formed from a rigid nylon plastic material, is shaped to engage the walls of the chamber and has a circular opening 58 to slide on to adapter 14. It also contains a multiplicity of small holes 60 for passage of the exhaust fluid.

Also mounted on adapter 14 is a muffler body 62. This is also formed from a rigid nylon plastic material, and is substantially L-shaped in cross-section. The horizontal leg 64 is shaped similarly to cap 56, with a circular opening 66 to encircle adapter 14. However, it is made slightly larger, to fit a counterbore 68 which extends around a portion of the bottom of chamber 53. It also has small exhaust holes 70, for venting the fluid to atmosphere.

The upstanding leg 72 of muffler body 62 is semicircular in horizontal cross-section, dimensioned to closely fit the body of adapter 14 and to partially encircle it. The top surface 74 of this leg 72 provides a seating surface for the underside of cap 56, spacing it in the chamber 53. An integral collar 76 of adapter 14 holds the body 62 in place longitudinally in chamber 53. The space between cap 56 and horizontal leg 64 contains a muffling material 78. This is preferably a porous, open-celled resilient material that generates minimal back pressure in the exhaust. One material found to be useful is a spongy urethane compound with open, loose construction. This material can be cut to fit any shape exhaust passage, and generates a minimum of back pressure while muffling the motor and fluid noises.

In assembling the insert, the muffler body 62 is slid down over hose adapter 14 until it abuts collar 76. The muffling material 78 (cut to conform to the curvature of adapter 14 and to the walls of chamber 53) is next seated on the horizontal leg 64, and the cap 56 is slid down over the adapter. An annular gasket 80, made of cork or some like substance, is next over the adapter. This assembly is then inserted into chamber 53 and adapter 14 is threaded into the threaded end of inlet passage 20.

Thus, it can be seen that a single chamber in the bottom of the tool handle serves as both inlet and exhaust, and accommodating a muffler assembly, all without expensive casting procedures and with a minimum of machining.

We claim:

1. A portable pneumatic power tool comprising a housing, a rotary pneumatic motor in said housing, a handle portion extending from one side of said housing, passage means for air flow through said handle portion into said housing for providing operating fluid to said motor and for conducting exhaust fluid therefrom, said passage means being a single passage for at least a portion of the distance inwardly from the end of said handle remote from said housing, and insert means disposed within said single passage, said insert means including:
   (a) muffler means having an opening extending therethrough; and
   (b) hose adapter means extending through the opening in said muffler means for engagement with said handle means to hold said insert means in said single passage.

2. The power tool of claim 1 wherein said muffler means comprises a base, a muffler element, a cap, and a gasket, said base having a semi-circular upstanding leg partially encircling said insert means and a planar leg closing said exhaust portion of said passage, said planar leg having perforations for the passage of exhaust fluid, said muffler element lying inwardly of said planar leg in said exhaust portion of said passage, said cap encircling said hose adapter and overlying said muffler element, said hose adapter means being fastened into an internal inlet passage, and said gasket sealing the jointure of said adapter to said internal inlet.

* * * * *